United States Patent [19]
Kolodner et al.

[11] Patent Number: 5,971,610
[45] Date of Patent: Oct. 26, 1999

[54] FLUORESCENT THERMAL IMAGING USING RARE-EARTH CHELATE FILMS

[76] Inventors: Paul Robert Kolodner, 1025 Bloomfield St.; Karl Georg Hampel, 463 First St., Apt. 4E, both of Hoboken, N.J. 07030; Peter Ledel Gammel, 58 Whittingham Ter., Millburn, N.J. 07041

[21] Appl. No.: 08/842,631

[22] Filed: Apr. 16, 1997

[51] Int. Cl.⁶ .............................. G01K 11/00; G01K 3/00
[52] U.S. Cl. ............................................. 374/161; 374/137
[58] Field of Search .................................... 374/137, 161; 250/330, 458.1, 459.1, 461.1; 438/16; 356/43

[56] References Cited

U.S. PATENT DOCUMENTS

| | | |
|---|---|---|
| 4,455,741 | 6/1984 | Kolodner . |
| 4,679,157 | 7/1987 | Hirano et al. ........................ 374/161 |
| 4,708,494 | 11/1987 | Kleinerman ........................ 374/161 |
| 4,819,658 | 4/1989 | Kolodner . |
| 4,826,288 | 5/1989 | Mansfield et al. ................. 350/320 |
| 4,976,988 | 12/1990 | Honda ................................ 427/42 |
| 5,141,837 | 8/1992 | Nguyen et al. ..................... 430/135 |
| 5,176,786 | 1/1993 | Debe .................................. 156/600 |
| 5,332,316 | 7/1994 | Kleinerman ....................... 374/161 |
| 5,705,821 | 1/1998 | Barton et al. ..................... 250/458.1 |

*Primary Examiner*—William Oen
*Assistant Examiner*—Robin Clark

[57] ABSTRACT

There is disclosed a number of rare-earth chelitte compounds which are useful for fluorescent thermal imaging applications over a wide temperature range. Several of these materials are ideal for particular imaging applications. Between EuTFC and EuHFC films, the entire temperature range of 30–300° K. can be covered. The temperature sensitivity and other film properties may be tailored by varying the polymer in which the film is dissolved or changing from a dissolved film to a vacuum sublimated film.

5 Claims, 4 Drawing Sheets

FLUORESCENT THERMAL IMAGING USING RARE-EARTH CHELATE FILMS

FIELD OF THE INVENTION

This invention relates to the fabrication, evaluation and testing of electronic devices utilizing thermal imaging of fluorescent rare-earth chelate films and to the measurement of temperature profiles of a surface employing such films.

BACKGROUND OF THE INVENTION

Many rare-earth chelate compounds exhibit bright, narrow band fluorescence when illuminated with ultraviolet light. Thermal activation of a radiationless decay channel in some of these compounds causes the quantum yield of this fluorescence to exhibit a dependence on temperature. Thus, fluorescence micrographs of thin films of such materials contain information about the temperature field or profile of the surface of the underlying substrate which can be extracted by conventional image processing techniques. This technique can have high (sub-micron) spatial resolution as well as superior temperature sensitivity and resolution.

The aforementioned technique is particularly useful in the fabrication, testing and evaluation of solid state electronic devices whereby measurement of the temperature profiles during operation of the device is utilized as a quality control to detect elements operating below specification, as indicated by an abnormal temperature profile. It is also useful in obtaining temperature profiles of the surface of biological bodies and for the determination of the temperature of the surface of a body having a uniform temperature.

Details of the application of rare-earth chelate films for this purpose and the mode of operation, methods and apparatus embodying this technique can be found by reference to U.S. Pat. Nos. 4,455,741 and 4,819,658 issued to Paul R. Kolodner on Jun. 26, 1984 and Apr. 11, 1989, respectively, which patents are incorporated herein by reference. The particular films taught in those patents are films of EuFOD and EuTTA doped in a polymethylmethacrylate matrix. These films are suitable for obtaining temperature profiles near or above room temperature.

SUMMARY OF THE INVENTION

One aspect of this invention relates to a method for fabricating and/or testing devices or components including semiconductor devices such as integrated circuits, laser diodes, Josephson junction devices, accoustic wave devices, as well as any other device or component whereby flaws or inhomogeneities can be detected by means of surface temperature profiles as well as a method for determining the temperature profile of a surface. The methods may be employed during, or subsequent to, the fabrication of the item to be tested.

While the invention includes the use of rare-earth chelate thermal imaging films which are useful at or above room temperature, it is particularly directed to such films which are useful at temperatures of 200° K or less and especially to films which are useful at 100° K or less. At these temperatures, the invention is particularly suitable for use in conjunction with high $T_c$ superconducting devices and cooled semiconductor devices. Prior to the discovery of certain of the fluorophore films taught herein, neither this thermal imaging technique, nor any other imaging technique, was suitable for use for the evaluation of such low temperature devices.

The method for measuring the temperature profile of a surface comprises the steps of forming a layer, including an appropriate fluorescent material, in thermal contact with said surface, the fluorescence of said material varying as the temperature of said surface varies; subjecting the material to fluorescence inducing energy; and detecting the resultant fluorescence of the material. An important parameter in determining the suitability of a film is its $T_{50}$. $T_{50}$ is defined as the temperature at which the quantum yield, n, decreases as temperature increases, to 50% of its zero temperature value. When the surface to be measured is at a temperature in the order of less than 200° K, the preferred fluorescent material has a $T_{50}$ of not more than 200° K. Similarly, when the surface to be measured is at a temperature of about 100° K or less, the preferred fluorescent film has a $T_{50}$ of not more than about 100° K.

A device is tested or evaluated by means of its surface temperature profile by forming a thin layer of one or more appropriate temperature sensitive, fluorescent materials, preferably a raze-earth chelate, on a partially or fully completed device; exposing the material to energy to cause the material to fluoresce; monitoring the fluorescence of the material while power is applied to the device; and accepting, rejecting, further processing or evaluating the device in response to the monitored fluorescence.

We have discovered that significant improvements can be achieved when measuring the temperature profile of it device, the operation of which may be impeded by the mass of the film, e.g. accoustic wave devices such as an accoustic thin film resonators, by utilizing thin fluorescent films formed by vacuum sublimation as opposed to films formed by dispersing or dissolving the chelate in a polymer matrix as described in the aforementioned prior patents. Further, we have found that vacuum sublimated films are also particularly useful at low temperatures where films having a polymer matrix tend to delaminate. The sublimated films are resistant to such delamination. We have also discovered new useful rare-earth chelates from which useful films can be formed by means of the known film forming methods.

Particularly useful rare-earth chelates comprise at least one member selected from the group consisting of EuTFC, TbFOD, EuBA, EuHFC, EuTHD, YTED, EuDBM, EuTA, EuTFA, TbTTA, TbHFA, DYFOD, YAA, TbTFA, EuDCM, TbBA, TbAA, and TbTHD, wherein Eu is Europium, Tb is Terbium, Y is Yttrium, Dy is Dysprosium, TFC is 3-trifluoromethylhydroxymethylene-(+)-camphorate, FOD is 6,6,7,7,8,8,8-heptafluoro-2,2-dimethyl-3,5-octanedionate, BA is benzoylacetonate or phenylbutanedionate, HFC is 3-heptafluoropropylhydroxymethylene-(+)-camphorate, THD is 2,2,6,6-tetramethyl-3,5-heptanedionate, DBM is dibenzoylmethide, TA is trifluoroacetate, TFA is trifluoroacetylacetonate, TTA is 4,4,4-trifluoro-1-(2-thienyl)-1,3-butanedionate, HFA is hexafluoroacetylacetonate, AA is acetylacetonate and DCM is d,d-dicampholylmethanate. Also preferred, especially for use with superconducting and cooled semiconductor high power microwave transmission devices, axe vacuum sublimated EuFOD, EuTFC and EuTTA films.

It is also contemplated as part of this invention that the aforementioned chelate films may be used in any fluorescent imaging device or study, including the imaging of the surface of a biological body, wherein the image is a function of the temperature profile or temperature differentials on a surface, especially in low temperature environments. It is further contemplated that temperature dependent optical properties other than temperature dependent fluorescence quantum yield, e.g. the Verdet effect in europium selenide or yttrium iron carnet, could also be used as a basis for thermal imaging.

It should be further understood that temperature profiles can be attained which are either qualitative or quantitative. That is, if one does not calibrate the fluorescent output with temperature, the results will be qualitative. If calibrated the results will be quantitative and the actual temperature at any point on the surface can be determned. It should also be understood that when the surface has a uniform temperature, this techique can be employed for determining that temperature.

DETAILED DESCRIPTION

Figure 1:
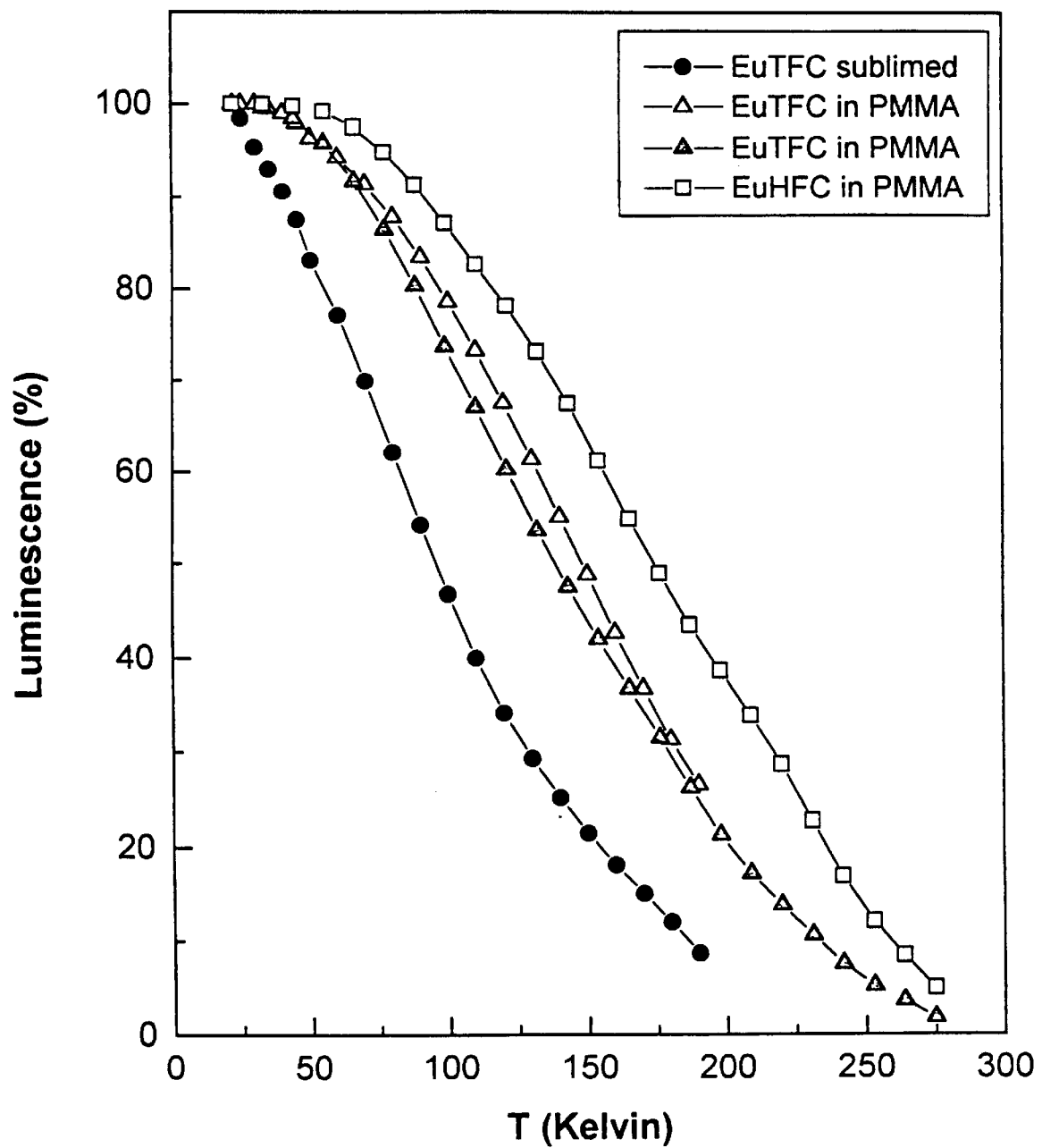
FIG. 1 is a plot of the fluorescent intensity of certain chelate films at 614 nm, expressed as a percentage of its value extrapolated to zero temperature, as a function of absolute temperature.
Figure 2:
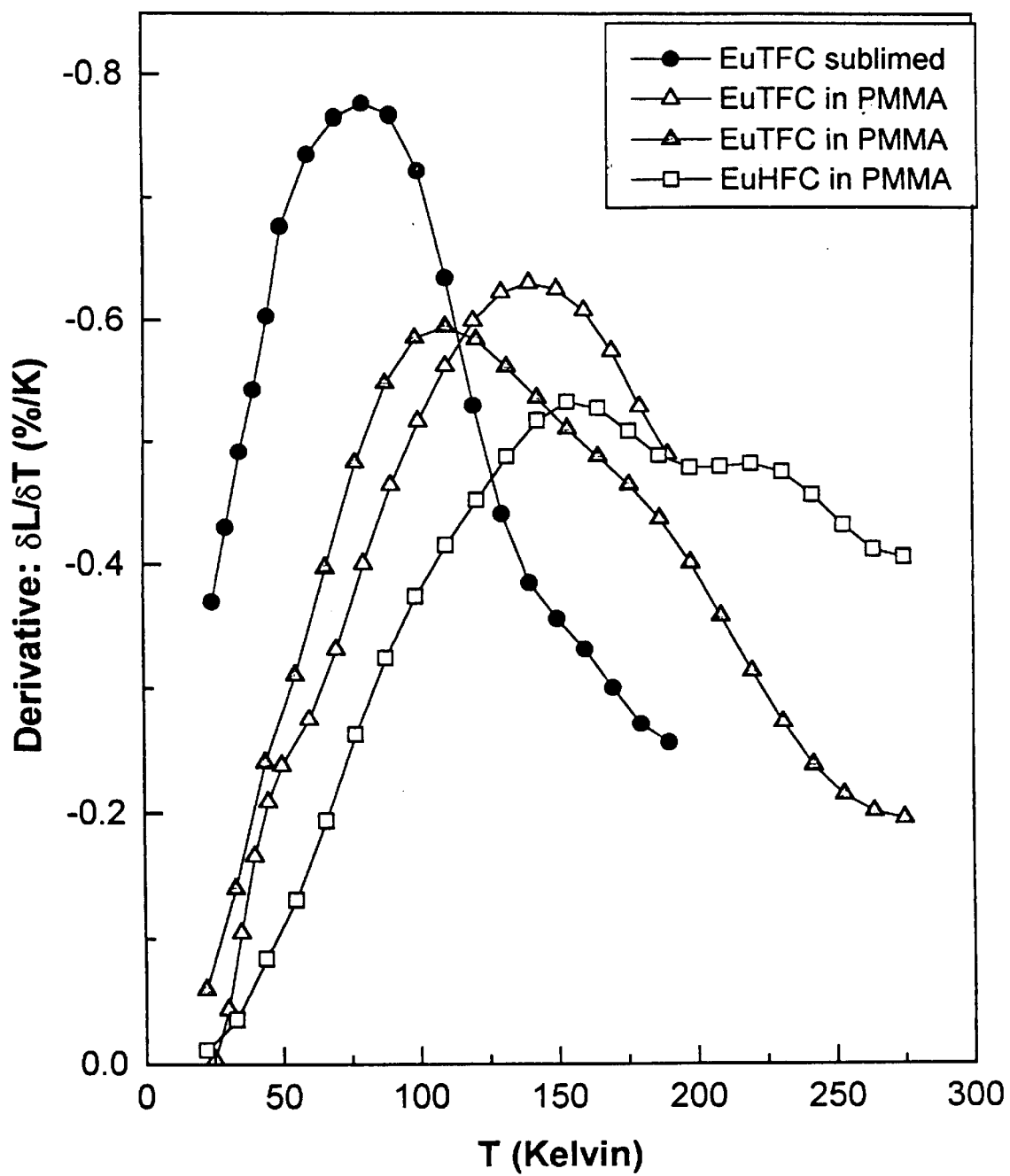
FIG. 2 is a plot of the derivative of the curves of FIG. 1 as a function of absolute temperature.

Fluorescent thermal imaging is a technique which exploits the temperature dependence of the quantum yield of a fluorophore, e.g. a rare earth chelate. The chelate is applied to the surface of the substrate or device whose surface temperature profile is to be measured, in the form of a thin film. The films may comprise the chelate codissolved with a polymer in it solvent and deposited on the surface of the device by spin coatilng. Any polymer with which the chelate may be dissolved, with or without the aid of a solvent, is suitable. A preferred polymer is polymethylmethacrylate. Typically suitable solvents for most of the chelates include chlorobenzene, chloroform, and mixtures thereof. Alternatively, one can dissolve the chelate together with a monomer or oligomer, spin coat and then polymerize the coating. However, it has now been found that in order to obtain films useful for obtaining temperature profiles of accoustic wave devices without interfering with the output of the device and further, which do not tend to delaminate when evaluating high Tc superconductor or cooled semiconductor high power microwave transmission devices at their operating temperatures, vacuum sublimated films are preferred. Because these films are 100% fluorophore, they can be made thin enough so as not to interfere with the accoustic properties of accoustic wave devices such as thin film accoustic resonators and they do not tend to delaminate even when used at very low temperatures.

We have discovered that preferred films for such purposes are formed by vacuum sublimating the chelate onto the surface of the device, rather than dissolving the chelate in a polymer matrix. Because such vacuum sublimated films are 100% fluorophore, usable fluorescence levels can be achieved with vacuum sublimated films as thin as a few hundred angstroms. These films have also been extremely useful for room temperature thermal imaging of devices that are extremely sensitive to mass loading such as thin film resonator microwave filters.

The basic technique involved in device testing, e.g. failure analysis and reliability testing of IC or other electronic devices is as follows. A device is tested or evaluated by means of its surface temperature profile by forming a thin layer of one or more appropriate temperature sensitive, fluorescent materials, preferably a rare-earth chelate, on a partially or fully completed device; exposing the material to energy to cause the material to fluoresce; monitoring the fluorescence of the material while power is applied to the device; and accepting, rejecting, further processing or evaluating the device in response to the monitored fluorescence. Dividing power-on and power-off fluorescence images of the coated device normalizes spatial variations in illumination intensity, surface reflectivity, and film absorption, yielding an image of the fluorescence quantum yield that can be decalibrated to make a temperature map of the surface of the device. Such thermal images can exhibit sub-micron spacial resolution, since diffraction of the fluorescence places the only fundamental limit on the resolution. Further, temperature sensitivity is limited only by shot noise in the fluorescence. Hence, long exposure times can yield high temperature resolution (less than 0.1° K) as well.

A variation of the basic technique employs a film which emits radiation at two wavelengths with quantum yields that depend differently on temperature. Here, the ratio of the images made at the two different wavelengths yields a correctly normalized temperature map without the need to acquire images at two power levels. This will eliminate possible artifacts due to thermal expansion. Further, super-resolution techniques such as NSOM could be used to overcome the spatial resolution limitation imposed by diffraction.

In the past, thermal imaging IC failure analysis and accelerated aging tests typically involved fluorescent films operative at temperatures from around room temperature to 200° C. However, such films are not suitable for use at low temperatures such as those associated with the operation of high-$T_c$ superconducting and cooled semiconducting devices which operate from 50° K. to less than 200° K. and generally less than 100° K. This is especially true for low temperature high power microwave transmission devices where we found that the imaging film thickness and/or weight must be low enough so as not to cause delamination with changes in temperature. This unexpected finding further prevented the use of previously reported films for analysis of such devices.

We have now identified new useful fluorescent chelate materials whose fluorescent quantum yields exhibit useful temperature dependencies over temperatures ranging from 30° K to ~370° K. While for use at higher temperatures (297–370° K), any prior art film forming technique is suitable, e.g. spin coating the fluorophore in a polymethylmethacrylate matrix, we have discovered that when used to analyze the low temperature, high-power microwave transmission devices, vacuum sublimation of the fluorophore is preferred and at times, critical for achieving the films which will not delaminate from the surface of the device, therby losing thermal contact with the surface.

It may be noted that none of the chelates of Sm, Pr, Er, Tm and Yb which were tested in a PMMA film were useful at liquid nitrogen temperatures; similar results were found with respect to all but one each of Y and Dy chelates. However, such materials might, in fact, be usable at much lower temperatures or as sublimated films.

PMMA-based films were made using solutions of 1% fluorophore and 2% PMMA by weight in an appropriate solvent. Vacuum evaporated films were made by standard techniques well known to those in the art. All of the materials exhibited peak ultraviolet absorption in the range of 300–360 nm, so that a standard high pressure Hg arc lamp with a Schott U-11 filter and a red blocking filter is the optimum excitation source.

The Table set forth below lists the compounds which were observed to exhibit temperature dependent fluorescence quantum yields in order of increasing $T_{50}$.

| CHELATE | SOLVENT | SUBLIMATED | $T_{50}$, °K. |
|---|---|---|---|
| EuTFC | | x | 95 |
| EuTFC | CF | | 145 |
| TbFOD | (1,2) | | ~170 |
| EuBA | CF or 1:1 CB/CF | | 170 |
| EuHFC | CB or 2:1 CB/CF | | 175 |
| EuTHD | CB | | 180 |
| EuDBM | CF, PS (3) | | >77 – <297 |
| EuTA | 1:1 NMP/CB | | >77 – <297 |
| YPHD | 2:1 CB/CF | | >77 – <297 |
| EuTFA | CB | | ~180 |
| TbTTA | (4) | | ~200 |
| TbTTA | | x | |
| EUFOD | CF or 1:1 CB/CF | | 225 |
| EuFOD | | x | |
| TbHFA | | (5) | |
| DyFOD | CB | | 250 |
| YAA | (1,2) | (5) | >297 |
| TbTFA | CF | | >297 |
| EuTTA | CB or 1:1 CB/CF | | ~313 |
| EuTTA | | x | |
| EuDCM | CF | | ~323 |
| EuDCM | | x | |
| TbBA | CB | | ~348 |
| TbAA | 1:1 CB/CF | (5) | ~358 |
| TbTHD | 1:1 CB/CF | (6) | ~373 |

(1) Insoluble in CF, CB, NMP, DMSO, AN, AC, CH, MEK and ED.
(2) Melting in air destroys room temperature fluorescence.
(3) Exhibits greater temperature sensitivity in polystyrene (PS) than in PMMA.
(4) Somewhat soluble in CF, CB, AN and DMSO (PMMA is insoluble in DSMO); less soluble in CH, MEK, ED and AC; poorly soluble in DMS.
(5) Decomposes when heated in vacuum.
(6) Lost fluorescence.

It should be noted that for materials which decompose or lose their fluorescence during sublimation and which an adequate solvent cannot be found, one can form a useful film by conventional coating techniques of a colloidal dispersion of the fluorophore in a binder and vehicle. PMMA in a solvent can act as such binder and vehicle.

Plots of the temperature dependence of fluorescence of some of the novel films axe shown in FIGS. 1–4. Note that except for vacuum sublimated films, unless otherwise noted, the films comprised the chelate in a PMMA matrix. Further, the abreviations for the above indicated solvents are as follows: AC is acetone; AN is anisole; CB is chlorobenzene; CF is chloroform; CH is cyclohexane; DMF is dimethyl formamide; DMSO is dimethyl sulfoxide; ED is ethylene dichloride; MEK is methy ethyl ketone; NMP is n-methyl pyrrolidinone; and PS is polystyrene.

EuTFC vacuum sublimated films appear to be the most preferred film for low temperature thermal imaging. These films exhibit a peak absorbance of 312 nm; a 2000 Angstrom film absorbs ~80% of the incident excitation light; and have the lowest observed $T_{50}$, namely 95° K. Further the temperature derivative of the fluorescence intensity (see FIGS. 1 and 2) is roughly constant over the temperature mange of 40–110° K, exactly the temperature range of operation of present high-$T_c$ superconducting microwave devices, and is useful for thermal imaging in a range of from about 30–200° K. In comparison, EuTFC/PMMA films exhibited a peak absorption near 334 nm and a $T_{50}$ of 145° K. The useful range of this film is about 75–200° K. All EuTFC films were quite bright at zero temperature. The large difference between the $T_{50}$ of sublimated EuTFC films and EuTFC/PMMA films was unexpected.

Figure 3:
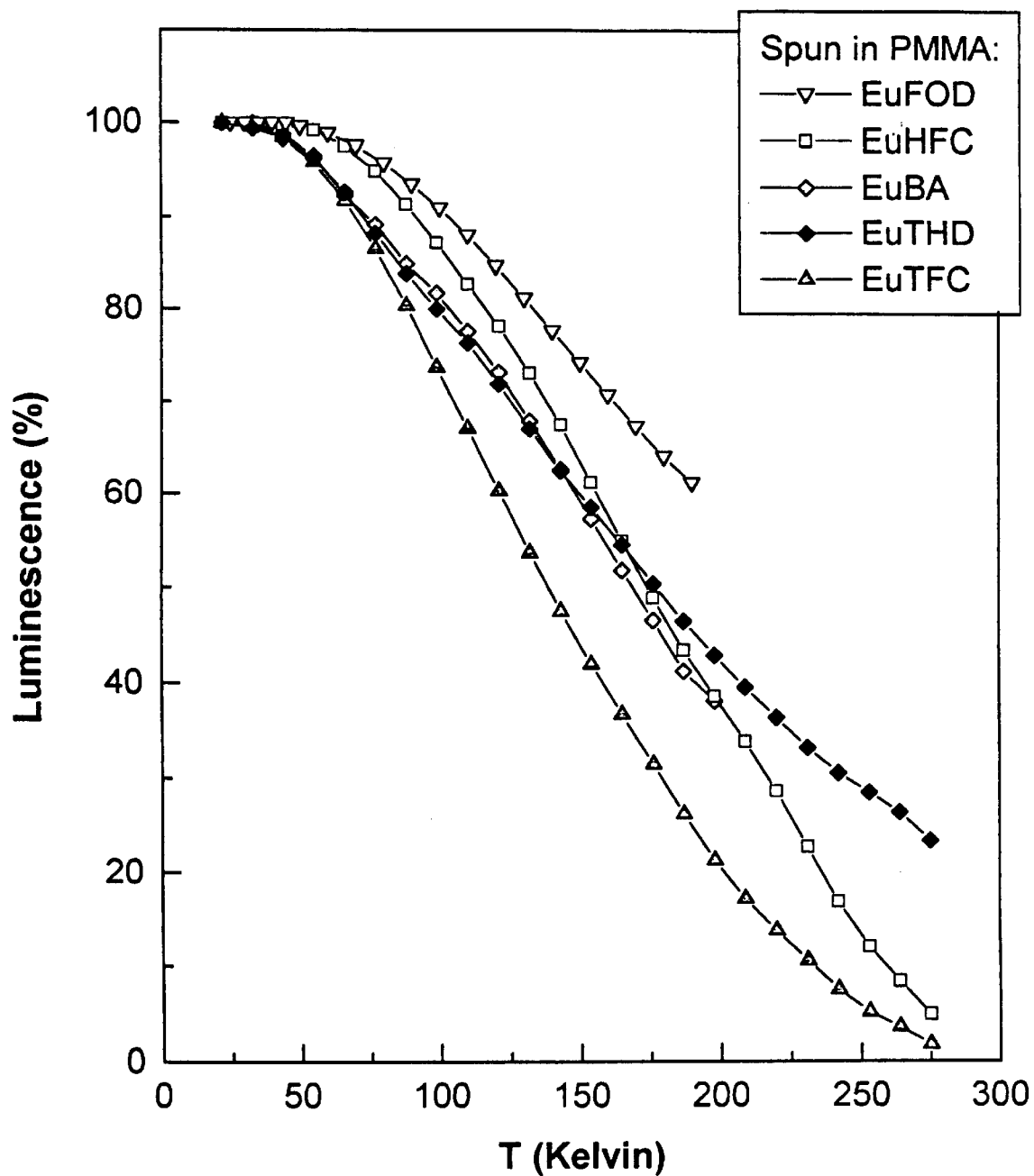
FIG. 3 is a plot similar to that of FIG. 1 of four additional chelate films of the invention.
Figure 4:
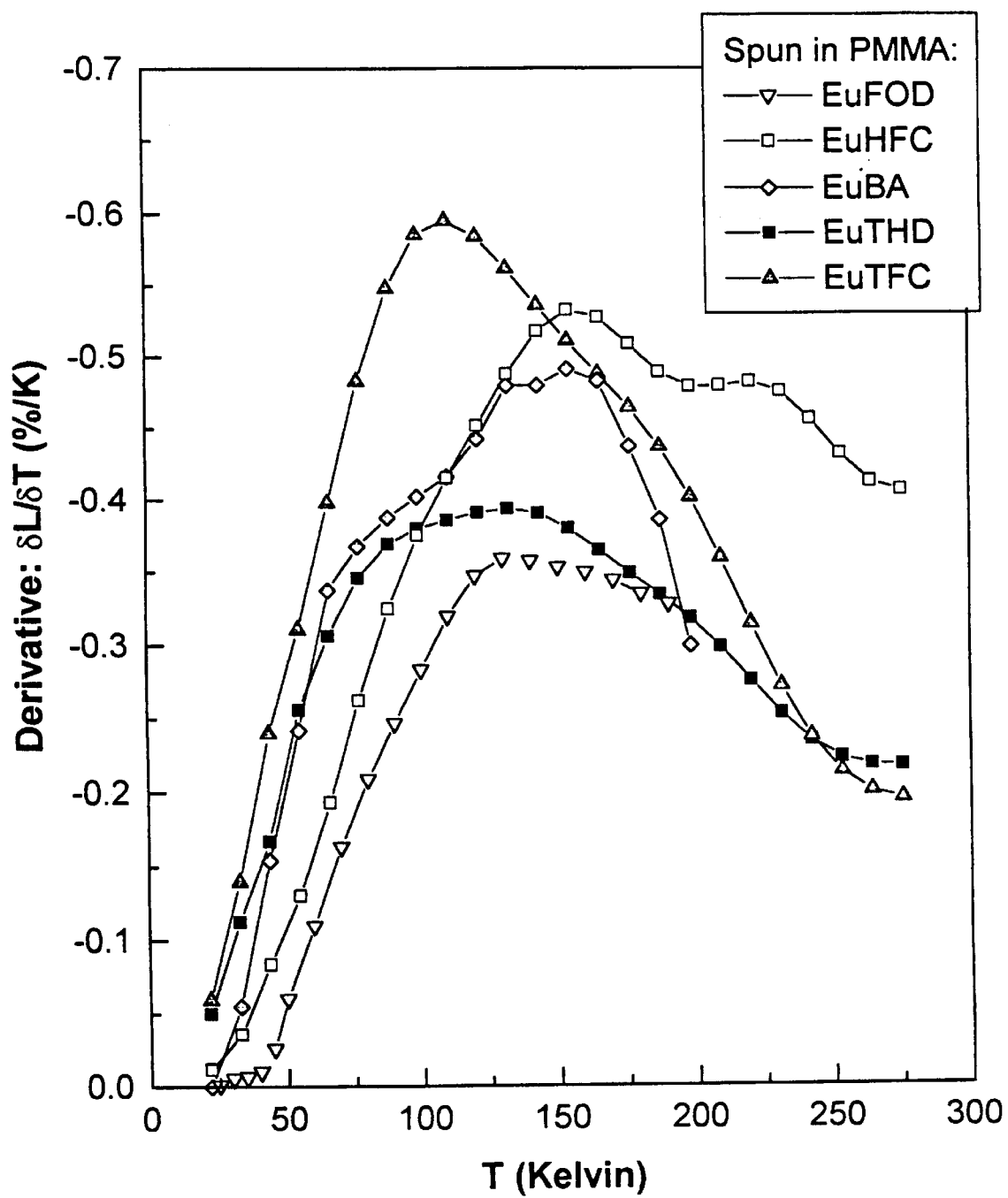
FIG. 4 is a plot of the derivative of the curves of FIG. 3 as a function of absolute temperature.

EuBA/PMMA films, shown in FIGS. 3 and 4, have a $T_{50}$ of 170° K and are useful in the range of about from 70–180° K. However, the fluorescence intensity of this material extraolated to zero temperature is weak. TbFOD/PMMA and TbTTA/PMMA films exhibited temperature sensitivities comparable to that of EuBA/PMMA.

The useful range of EuHFC/PMMA films is 100–250° K. These films exhibited the brightest zero temperature fluorescence of the materials examined.

The useful range of EuTTA/PMMA films is 70–200° K. These films exhibit a temperature sensitivity comparable to that of EuTHD/PMMA films.

Sublimated EuFOD films having a thickness of about 300 nm absorb ~68% of the incident ultraviolet light. 100 nm thick EuTTA sublimated films absorb about 80% of the incident 365 nm uv light. These filoms, which have a useful temperature range of between about 300–350° K, are ideal for room temperature imaging of thin film resonator devices. 100 nm thick sublimated films of EuDCM are less bright at room temperature than than sublimated EuFOD films of the same thickness.

In summary, we have discovered a number of rare-earth chelate compounds which are useful for thermal imaging over a wide temperature range. Several of these materials are ideal for particular imaging applications. Between EuTFC and EuHFC films, the entire temperature range of 30–300° K can be covered. The temperature sensitivity and other film properties can be tailored by varying the polymer in which the film is dissolved or changing from a dissolved film to a vacuum sublimated film. We have also discovered that in order to obtain temperature profiles of operating accoustic wave devices without affecting or attenuating the output of the device, it is important to use a vacuum sublimated film of a temperature sensitive fluorophore, regardless of the operating temperature of the device. In this way, a film having a sufficient fluorescent output and low mass can be prepared. We have also discovered that in order to prevent delamination of the imaging film from the surface whose temperature profile is to be obtained at very low temperatures, e.g. less than 200° K, it is also preferable to use vacuum sublimated films.

What is claimed is:

1. A method for testing a superconducting device during or subsequent to fabrication thereof by measuring the temperature profile of its surface comprising the steps of:

forming a layer of a fluorescent material in thermal contact with said surface, the fluorescence of said material varying as the temperature of said surface at the point of contact therewith varies, said material having a $T_{50}$ of not more than 200° K.;

subjecting said material to fluorescence-inducing energy;

and detecting the resultant fluorescence of said material.

2. The method of claim 1 wherein said material has a $T_{50}$ of not more than 100° K.

3. The method of claim 1 wherein said material is a vacuum sublimated film.

4. The method of claim 3 wherein said material is EuTFC.

5. The method of claim 6 wherein said material is EuFOD.

* * * * *